United States Patent
Anderson et al.

(10) Patent No.: US 6,763,358 B2
(45) Date of Patent: Jul. 13, 2004

(54) METHOD AND SYSTEM FOR ACTIVATING COLUMN TRIGGERS IN A DATABASE MANAGEMENT SYSTEM

(75) Inventors: Mark John Anderson, Oronoco, MN (US); Theresa Renee Euler, Oronoco, MN (US); Russ Owen, Rochester, MN (US); Richard Donald Parrott, Rochester, MN (US); Kathy Lynn Passe, Oronoco, MN (US); Jonathan Lee Triebenbach, Rochester, MN (US); Michael Alan Venz, Rochester, MN (US); Jane Ann Vold, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 09/817,907

(22) Filed: Mar. 26, 2001

(65) Prior Publication Data
US 2002/0194189 A1 Dec. 19, 2002

(51) Int. Cl.[7] .............................................. G06F 17/00
(52) U.S. Cl. ............................ 707/102; 707/2; 707/10; 707/100; 707/101; 707/103; 707/104
(58) Field of Search ........................... 707/2, 103, 104, 707/10, 100, 101, 102; 717/170

(56) References Cited

U.S. PATENT DOCUMENTS

| | | | | |
|---|---|---|---|---|
| 5,926,819 A | * | 7/1999 | Doo et al. | ................... 707/104 |
| 6,108,664 A | * | 8/2000 | Nori et al. | ................... 707/103 |
| 6,367,077 B1 | * | 4/2002 | Brodersen et al. | .......... 717/170 |
| 6,374,236 B1 | * | 4/2002 | Chen et al. | .................... 707/2 |
| 6,405,212 B1 | * | 6/2002 | Samu et al. | ................ 707/103 |
| 6,564,203 B1 | * | 5/2003 | Krishnaprasad et al. | ....... 707/2 |
| 2002/0198891 A1 | * | 12/2002 | Li et al. | ..................... 707/102 |

* cited by examiner

Primary Examiner—Thuy N. Pardo
(74) Attorney, Agent, or Firm—Moser, Patterson & Sheridan, LLP

(57) ABSTRACT

Methods, systems, data structures and articles of manufacture are provided for maintaining a list/tally of columns that are modified by an I/O operation. The list allows for determining which triggers, both row and column oriented, should be activated upon the operation. In addition, a tracking mechanism is provided to track modifications to additional columns that occur because of the triggers being executed.

In another embodiment, management of modifications to existing database objects (i.e., table definitions) is automated. Modifications to the table definition include, for example, changing the number of columns and the data type definitions. Accordingly, in one embodiment, if a column is added or removed from a database table, the database management system automatically updates and manages the tracking mechanism so the actual number of columns that exist in the database table is accurately reflected. In this manner, the integrity of the DBMS is maintained.

14 Claims, 8 Drawing Sheets

*Fig. 4*
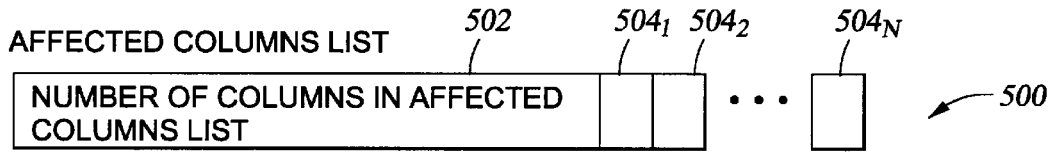
*Fig. 5*
TRIGGER DEFINITION #1                                1000'
SPECIFIC COLUMNS ARRAY
| NUMBER OF COLUMNS | COLUMN 2 | COLUMN 3 |
MODIFIED COLUMNS INDICATOR ARRAY
| NUMBER OF COLUMNS | COLUMN 2 | COLUMN 3 |
*Fig. 13*

| TABLE DEFINITION | | | | ⟵ 700 |
|---|---|---|---|---|
| NUMBER OF COLUMNS | COLUMN 1 | COLUMN 2 | COLUMN 3 | |

TALLY ( INITIALIZED )

| | $802_1$ | $802_2$ | $802_3$ |
|---|---|---|---|
| NUMBER OF COLUMNS | OFF | OFF | OFF |

TALLY ( PRIMED )

| | $802_1$ | $802_2$ | $802_3$ |
|---|---|---|---|
| NUMBER OF COLUMNS | ON | OFF | OFF |

AFFECTED COLUMNS LIST

| | 902 |
|---|---|
| NUMBER OF COLUMNS | COLUMN 1 |

*Fig. 9*

TRIGGER DEFINITION #1 — 1000

SPECIFIC COLUMNS ARRAY — 308A

| NUMBER OF COLUMNS | COLUMN 1 | COLUMN 2 | COLUMN 3 |
|---|---|---|---|

MODIFIED COLUMNS INDICATOR ARRAY — 310A

| NUMBER OF COLUMNS | COLUMN 1 | COLUMN 2 | COLUMN 3 |
|---|---|---|---|

*Fig. 10*

TABLE DEFINITION FOR TABLE T1 — 700'

COLUMN DEFINITION INFORMATION

| # OF COLUMNS | COLUMN 1 | COLUMN 2 | COLUMN 3 | COLUMN 4 |
|---|---|---|---|---|

*Fig. 11*

TABLE DEFINITION FOR TABLE T1 — 700'

COLUMN DEFINITION INFORMATION

| NUMBER OF COLUMNS | COLUMN 2 | COLUMN 3 |
|---|---|---|

*Fig. 12*

METHOD AND SYSTEM FOR ACTIVATING COLUMN TRIGGERS IN A DATABASE MANAGEMENT SYSTEM

BACKGROUND OF THE INVENTION

1. Field of the Invention

Embodiments of the present invention relate to information processing and more specifically to management of database triggers.

2. Background of the Related Art

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Reference is made to C. J. Date, *An Introduction to Database Systems*, 6th edition, Addison-Wesley Publishing Co. Reading, Mass. (1994) for an comprehensive general treatment of the relational database art.

An RDBMS is structured to accept commands to store, retrieve and delete data using high-level query languages such as the Structured Query Language (SQL). The term "query" denominates a set of commands for retrieving data from a stored database. The SQL standard has been promulgated by the International Standards Association since 1986.

A major goal of the underlying query compiler is to provide a suite of mechanisms so that user data can be easily stored and efficiently manipulated. In particular, an SQL query can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across one or more tables.

Regardless of the type and creator, tables are manipulated uniformly by means of the Data Manipulation Language (DML), such as those defined in the SQL standards. In some cases, a table is manipulated by the use of triggers. Triggers are procedures that are defined by users of the RDBMS. The RDBMS invokes triggers when particular events (associated with the triggers) occur. Specifically, a trigger program is written to take some action due to an insert, update, or delete operation against a table in a database. For example, in the case of an insert operation, a trigger can be defined such that it is invoked each time a row is inserted into a particular table. A trigger can instruct the system to take any number of actions when a specified change is attempted. Accordingly, triggers can be used to help maintain the integrity of the database.

Conventionally, triggers are defined through a particular interface such as high level query language (e.g., SQL). Database systems providing only one interface facilitate the management and consistency of triggers because trigger definition, database or table accesses, and execution is the same in each instance. However, a problem arises where multiple interfaces are supported by a database management system. For example, a system may provide high level query language interfaces and database management interfaces. Illustrative database management interfaces include GUI interfaces for PCs or workstations, application program interfaces (APIs), and command line interfaces for terminal type devices. One well known system that includes multiple interfaces to the DBMS is the eServer iSeries available from International Business Machines, Incorporated (IBM) of Armonk, N.Y.

In a database management system, that allows the definition of triggers, via either a high level query language or via database management interfaces, a method is required for determining which triggers should be activated upon a database operation occurring in the database. In some cases, specific control or management techniques are required by virtue of the trigger characteristics. For example, one well known trigger, referred to as a column trigger, is only activated upon a database operation to a specific column of data in a database table. Accordingly, the database management system needs a method for determining which columns of the database table the trigger is associated with, in order to determine which triggers should be activated upon a database operation occurring in the database.

The need for trigger management is compounded by the fact that one of the operations that a column trigger can perform is to modify the column values of the database table prior to the actual database operation (e.g., insert or update). Such triggers are known as "before" triggers, suggestive of their preemptive nature. Thus, the database management system also needs a method for determining which columns of the database table the trigger itself is modifying, so that in a network of triggers, the complete network of triggers is properly activated based on the originating database operation, and the operations of the triggers. In each case, the foregoing trigger management methods should be capable of supporting multiple interfaces.

Therefore, there is a need for a method and system for managing column triggers, particularly in a system having multiple interfaces.

SUMMARY OF THE INVENTION

Methods, systems, data structures and articles of manufacture are provided for tracking modifications to columns as a result of an I/O operation. In one embodiment a list is provided that allows for determining which triggers, both row and column oriented, should be activated upon the operation. In addition, a tracking mechanism is provided to track modifications to additional columns that occur because of the triggers being executed.

In another embodiment, a data structure is provided wherein the data structure comprises a trigger definition for a trigger. The trigger definition comprises specific column information indicating at least one column of a table for which the trigger is defined and modified column information indicating at least one column modified by execution of the trigger. The specific column information and the modified column information are configured to be compared to the contents of a tally to determine whether the trigger should be run.

In yet another embodiment, a method of managing triggers in a database containing a plurality of column triggers is provided. The method comprises processing an input/output (I/O) operation, wherein the I/O operation is configured to affect at least one column of a database object and priming a tally to reflect the at least one column. For each column trigger defined for the database object, the method further comprises determining whether the column trigger is configured to be executed in response to the I/O statement with reference to the tally.

Still another embodiment provides a method of managing triggers in a database containing a plurality of triggers. The method comprises processing an input/output (I/O) operation, wherein the I/O operation is configured to affect at least one column of a database object, priming a tally to reflect the at least one column and determining whether a trigger defined for the database object is a BEFORE trigger. If the trigger defined for the database object is a BEFORE trigger, then the method further comprises determining whether the trigger is a column trigger. If the trigger is a column trigger, then the method determines whether the trigger is configured to be executed in response to the I/O operation with reference to the tally, wherein the trigger is executed if an entry value of the tally matches an indicator value indicating that the trigger is defined for the at least one column.

Still another embodiment provides a signal bearing medium containing a program which, when executed by at least one processor, performs a method of managing triggers in a database containing a plurality of column triggers. The method comprises processing an input/output (I/O) operation, wherein the I/O operation is configured to affect at least one column of a database object and priming a tally to reflect the at least one column. For each column trigger defined for the database object, the method further comprises determining whether the column trigger is configured to be executed in response to the I/O statement with reference to the tally.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

FIG. 4 is one embodiment of a data structure for a tally configured to track columns affected by in input/output operation and by subsequently occurring trigger operations.

FIG. 5 is one embodiment of a data structure for an affected columns list configured to track columns affected by an input/output operation.

FIG. 7 is a data structure illustrating a table definition having three columns.

FIG. 8A is an illustrative initialized tally.

FIG. 8B is an illustrative primed tally.

FIG. 9 is an illustrative affected columns list indicating one affected column.

FIG. 10 is an illustrative trigger definition.

FIG. 11 is an illustrative table definition.

FIG. 12 is an alternative illustrative table definition.

FIG. 13 is an alternative illustrative trigger definition.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Methods and systems are provided for associating triggers with particular columns of a database table and correctly determining which columns of the database table the triggers modify. Some embodiments disclosed herein use to advantage DB2 UDB for iSeries available from IBM. However, embodiments are contemplated for any data management system.

Figure 1:
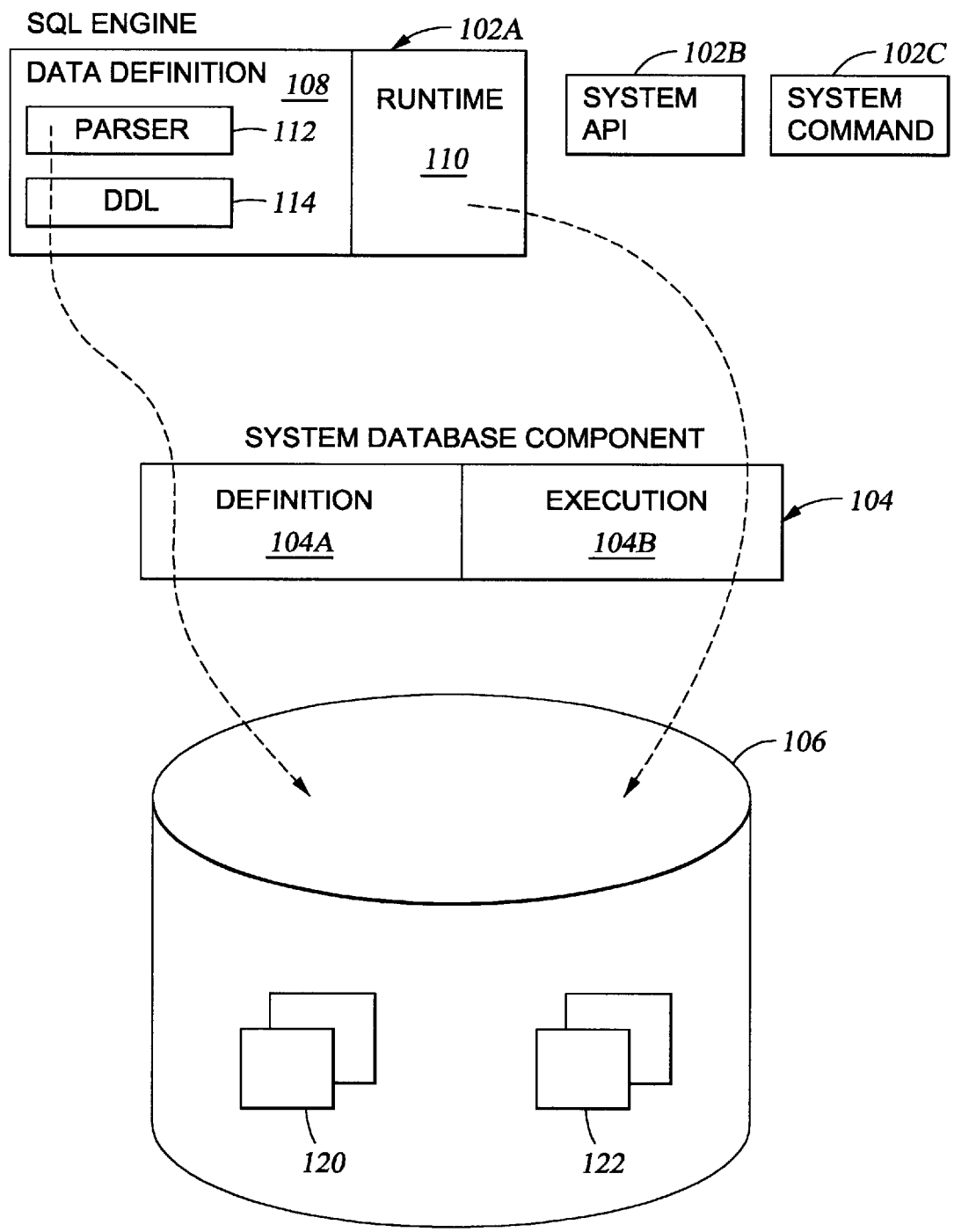
FIG. 1 is a high level diagram if a database system.

One embodiment of the invention is implemented as a program product for use with a computer system such as, for example, the system 100 shown in FIG. 1. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

FIG. 1 shows an embodiment of a database management system (DBMS) 100. The DBMS 100 is simplified for brevity, as many aspects of such systems are well known. In general, the DBMS 100 includes a plurality of interfaces 102A–C, a system database component 104, and a repository 106 for permanent objects (e.g., trigger definitions, table definitions, and user data stored in the tables). The interfaces 102A–C are each configured for different inputs. Specifically, an SQL interface 102A is configured to handle SQL statements, a system application programming interface (API) 102B is configured for program described requests and a system command interface 102C is configured for command line inputs. Illustratively, only three interfaces are shown. However, the DBMS 100 may include any number of interfaces. For brevity only the details of SQL interface 102A is provided and described below. Persons skilled in the art will readily understand the operation of the other interfaces 102B–C.

In general, each of the interfaces includes components necessary to handle and process input data. Thus, as exemplified by the SQL interface 102A, a data definition component 108 and a runtime component 110 are provided. The data definition component 108 includes a parser 112 and data definition language (DDL) program logic 114 for processing the DDL. Similarly, the system database component 104 includes a definition component 104A and an execution component 104B. The definition component 104A provides the logic for formatting definition requests to be stored in the repository 106. The execution component 104B provides the program logic for retrieving data values from a table stored in the repository 106.

In operation, the parser 112 and builds a parse tree from the SQL statement input the interface 102A. The DDL 114 then builds an object definition from the parse tree. In tandem with the definition component 104A, the data definition component 108 renders an executable representation of the SQL statement. When executed via the runtime component 110 and the execution component 104A, the SQL statement causes an operation (i.e., update, insert or delete) to occur with respect to the data contained in repository 106, according the statement type.

The repository 106 contains a plurality of tables 120 (i.e., table definitions and data) and triggers 122. The tables 120 are stored in the form of data structures containing table definition information. Likewise, the triggers are stored in the form of data structures containing trigger definition information. Illustrative table and trigger data structures are shown in FIGS. 2 and 3, respectively.

Figure 2:
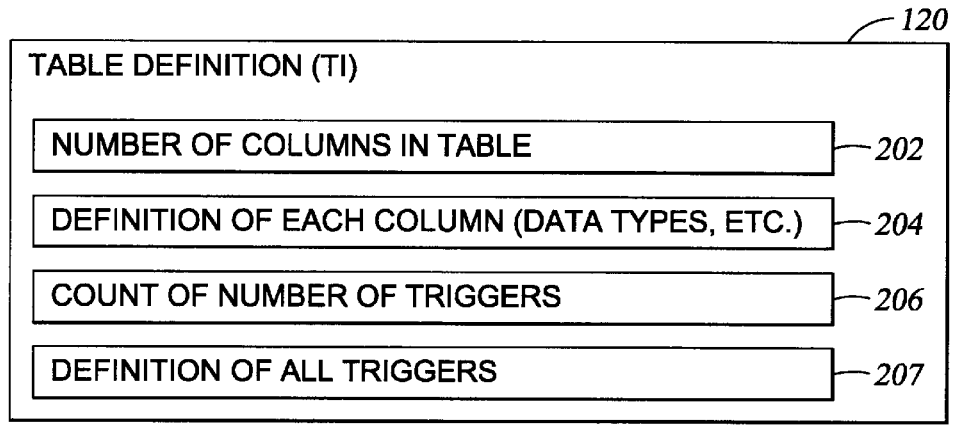
FIG. 2 is one embodiment of a data structure for a table definition.

FIG. 2 shows an illustrative table 120, T1, containing column number information 202, column definition information 204 and trigger count information 206. The column number information 202 reflects the number of columns defined for the table 120. The column definition information 204 includes definitional information for each column such as the data types (e.g., characters and integers) of a column, the number of each data type and the like. In the case of an array, the trigger count information 206 indicates the number of triggers defined on the table 120. Where other than an array, other representations may be used to advantage. For example, pointers or linked lists may be used for the same purpose. Each table 120 also includes a trigger definitions array 207 for all triggers defined on the table. Again, the use of an array is merely illustrative.

Figure 3:
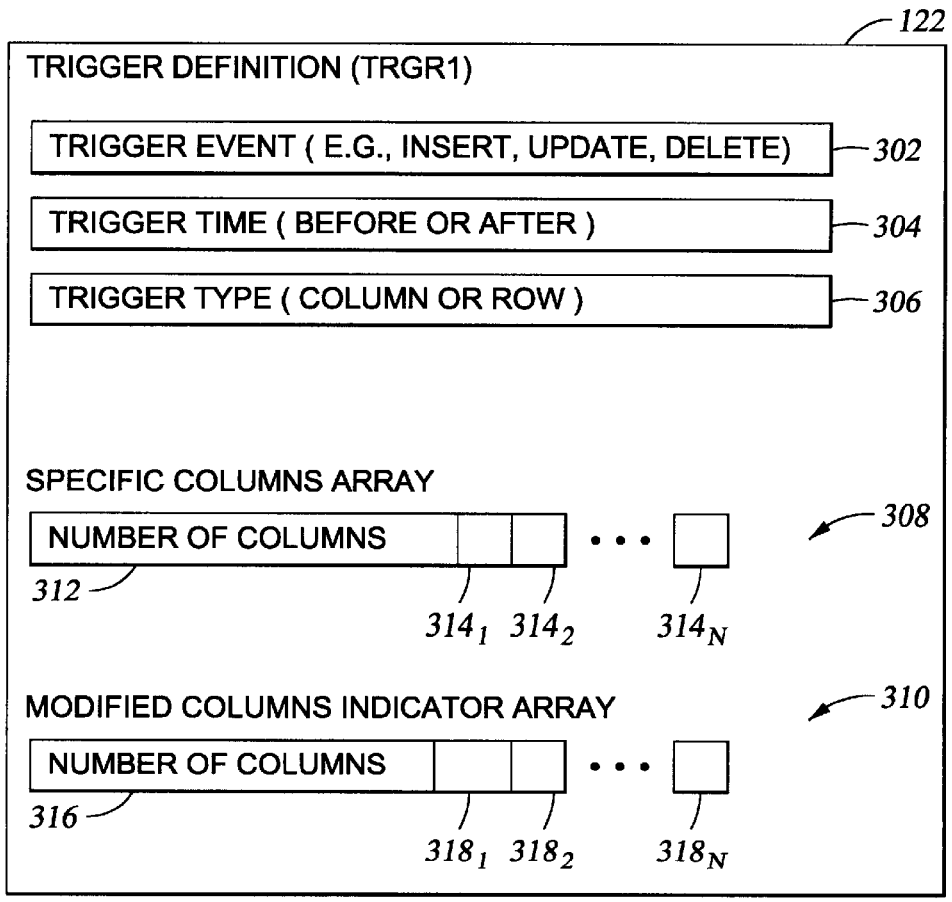
FIG. 3 is one embodiment of a data structure for a trigger definition referenced by the table definition of FIG. 2.

FIG. 3 illustrates a trigger definition 122 (i.e., one definition of the potentially multiple definitions in the trigger definitions array 207 ). A trigger definition having the format illustrated by trigger 122 is provided for each trigger of the DBMS 100. While the trigger definition 122 is generally intended to generically represent the format of each trigger, by way of example, FIG. 3 specifically represents a trigger, TRGR1, which is defined on table 120.

The information contained in the trigger 122 is accumulated at the time the trigger is defined in the DBMS 100. In general, the trigger 122 contains information identifying the type of the trigger and, in the case of a column trigger, the columns the trigger is defined for and the columns modified by the trigger. Accordingly, trigger event information 302 indicates what types of events, or operations, the trigger responds to. Illustrative trigger operations include INSERT, UPDATE or DELETE operations. Trigger time information 304 indicates whether the trigger is a BEFORE trigger or an AFTER trigger. As is well known, a BEFORE trigger takes some action prior to the writing the changes produced by the execution of the operation (e.g. insert) to the database (i.e., to the permanent structures). Conversely, an AFTER trigger takes action subsequent to the completion of the operation. In the case of UPDATE triggers, column information 306 indicates whether the trigger is defined for a column(s) or a row. In the former case, the trigger is referred to as a column trigger.

The trigger definition 122 shown in FIG. 3 includes a pair of lists 308 and 310. Illustratively, the lists 308 and 310 are shown as integral parts of the trigger definition. However, in other embodiments the lists 308 and 310 may be separate entities and can be associated with a trigger definition (e.g., by pointers or linked lists). In a particular embodiment, the lists are implemented as arrays. However, the particular implementation is not considered limiting and other embodiments will readily be appreciated by those skilled in the art. In general, each array contains one entry for each column contained in the database table for which the trigger is defined (in the case of TRGR1 this is T1). An entry in the array is set if the trigger is associated with the column, and/or if the trigger may modify the column.

A first list 308 (referred to herein as the "specific columns array") indicates which particular columns of the database table, T1, the trigger TRGR1 is associated with. That is, the list 308 indicates which columns of T1, when affected by an UPDATE operation, cause the trigger to fire. Accordingly, the list 308 is provided for a trigger definition only if the trigger is a column trigger, as indicated by the trigger type information 306. In one embodiment, the list 308 includes a "number of columns" entry 312 indicating how many columns the trigger TRGR1 is defined for and a bit value entry $314_1 \ldots 314_N$ for each column of the table T1 for which the trigger TRGR1 is defined. Accordingly, the number of bit value entries 314 is equal to the value contained in the "number of columns" entry 312. The bit value in each entry 314 is set ON if the trigger TRGR1 is defined for the respective column.

A second list 310 (referred to herein as the "modified columns indicator array") contains the columns that the trigger TRGR1, in turn, modifies. This information is provided regardless of whether the trigger is a column trigger or row oriented trigger. In one embodiment, the list 310 includes a "number of columns" entry 316 indicating how many columns the trigger TRGR1 modifies and a bit value entry $318_1 \ldots 318_N$ for each column which the trigger TRGR1 modifies. Accordingly, the number of bit value entries 318 is equal to the value contained in the "number of columns" entry 316. The bit value in each entry 318 is set to ON if the trigger TRGR1 modifies the respective column, otherwise the value is set to OFF.

Since the information for the list 310 is accumulated at the time the trigger TRGR1 is defined, the list 310 contains a complete map of all possible columns that the trigger TRGR1 may modify, regardless of which path of execution is chosen by conditional logic in the trigger. The path of execution is defined by the input conditions and the conditional logic of the trigger. A trigger definition may contain, for example, conditional logic in the form of "IF" statements, branching statements and the like. In general, such conditional logic causes selected trigger statements to be skipped or bypassed during the execution of the trigger. However, to ensure integrity, the conditional logic is ignored during the definition process and all statements are analyzed. If the statement can potentially modify the contents of a column, the column is added to the list 310.

During processing of a triggering operation, a tally, or score card, is maintained to identify the columns of a table being affected by the operation. One tally is maintained per I/O operation per affected table. FIG. 4 shows one embodiment of a tally 400. The tally 400 includes a columns entry 402 containing the number of columns in the tally, that is, the number of entries in an array of entries $404_1 \ldots 404_N$. The number entries $404_N$, in turn, is determined by the number of columns in the table definition, i.e., by the number contained in the columns entry 202. For example, in the event of an operation affecting T1, and if T1 comprises three columns, then a tally 400 containing three entries $404_N$ is created, one corresponding to each column of the table T1.

In addition to the tally 400, an affected columns list 500 is created at the time of an I/O operation. FIG. 5 shows an embodiment of an affected columns list 500. In general, the list 500 includes an array of entries $502_1 \ldots 502_N$, wherein each entry represents a column affected by the I/O operation. The total number of entries $502_N$ is stored in a column entry 504. It is noted that although the I/O statement (e.g., UPDATE) may reference a view comprising some fraction of an underlying base table, the tally 400 still represents all the columns of the underlying base table.

It should be noted that information may be provided which allows the DBMS 100 to track other tables modified by a particular trigger. However, for simplicity and brevity such information is not shown either as part of the trigger definitions or otherwise.

In operation, the DBMS 100 performs I/O operations which create and modify tables, such as T1, and create triggers such as TRGR1. Table 1 provides an exemplary sequence illustrating the creation of a table (T1) with three columns (lines 1–2) the insertion of values into T1 (lines 4–6), and the update of T1 whereby the value of the first column (COLUMN1) is changed to ten (10) (line 8).

TABLE 1

1 CREATE TABLE T1 (COLUMN1 INTEGER, COLUMN2 INTEGER,
2 COLUMN3 INTEGER)
3
4 INSERT INTO T1 VALUES (1, 1, 1)
5 INSERT INTO T1 VALUES (2, 2, 2)
6 INSERT INTO T1 VALUES (3, 3, 3)
7
8 UPDATE T1 SET COLUMN1 = 10

The lists 308 and 310 provide a mechanism for tracking the columns for which update triggers are defined and the columns modified by the trigger. In addition, the tally 400 and the affected columns list 500 provide a mechanism for tracking which columns are modified, whether by the original I/O operation or a trigger. Exemplary methods of operation are described by reference to FIG. 6.

Figure 6A:
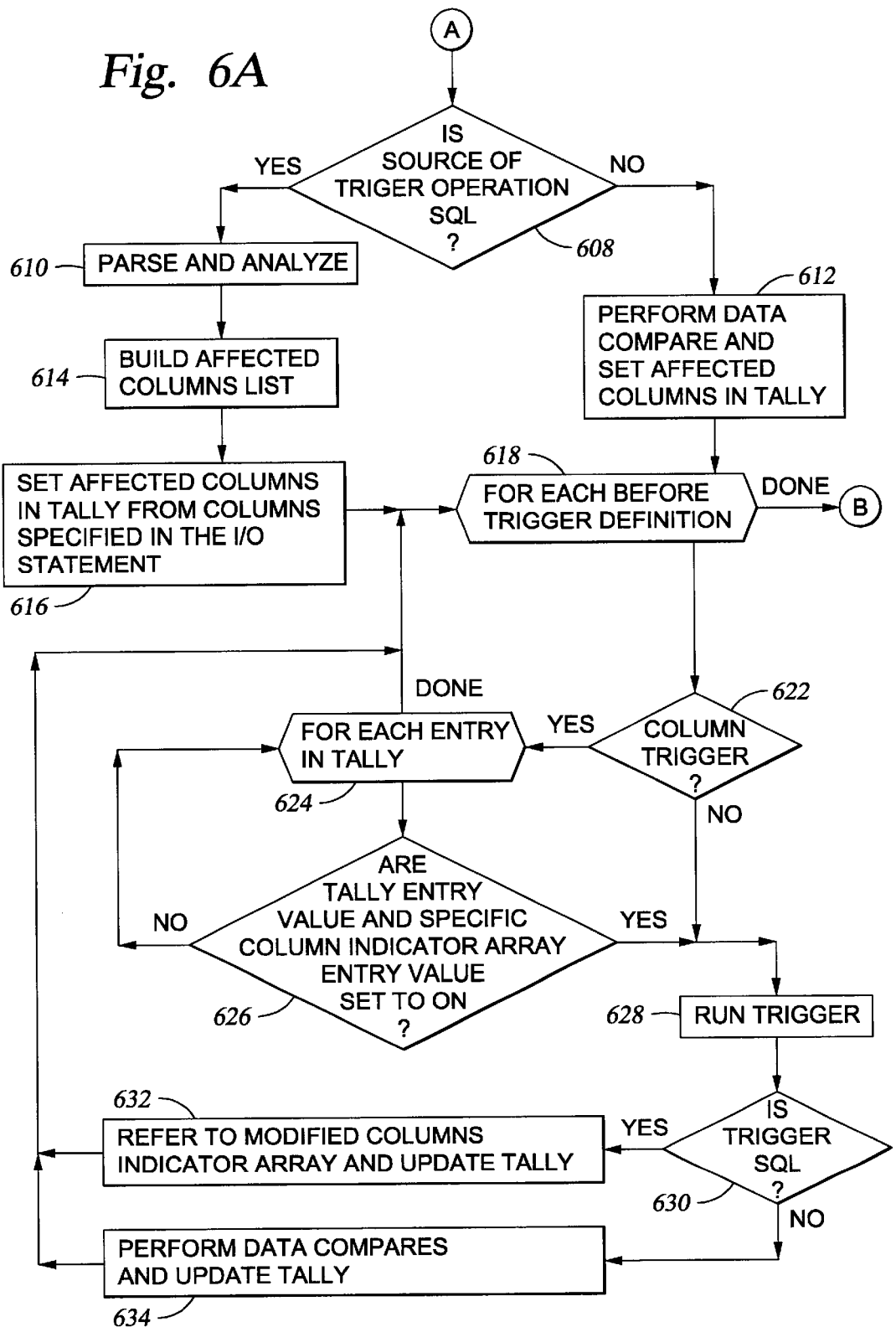
FIG. 6 is a flow chart illustrating a method of operating the database system of FIG. 1.
Figure 6B:
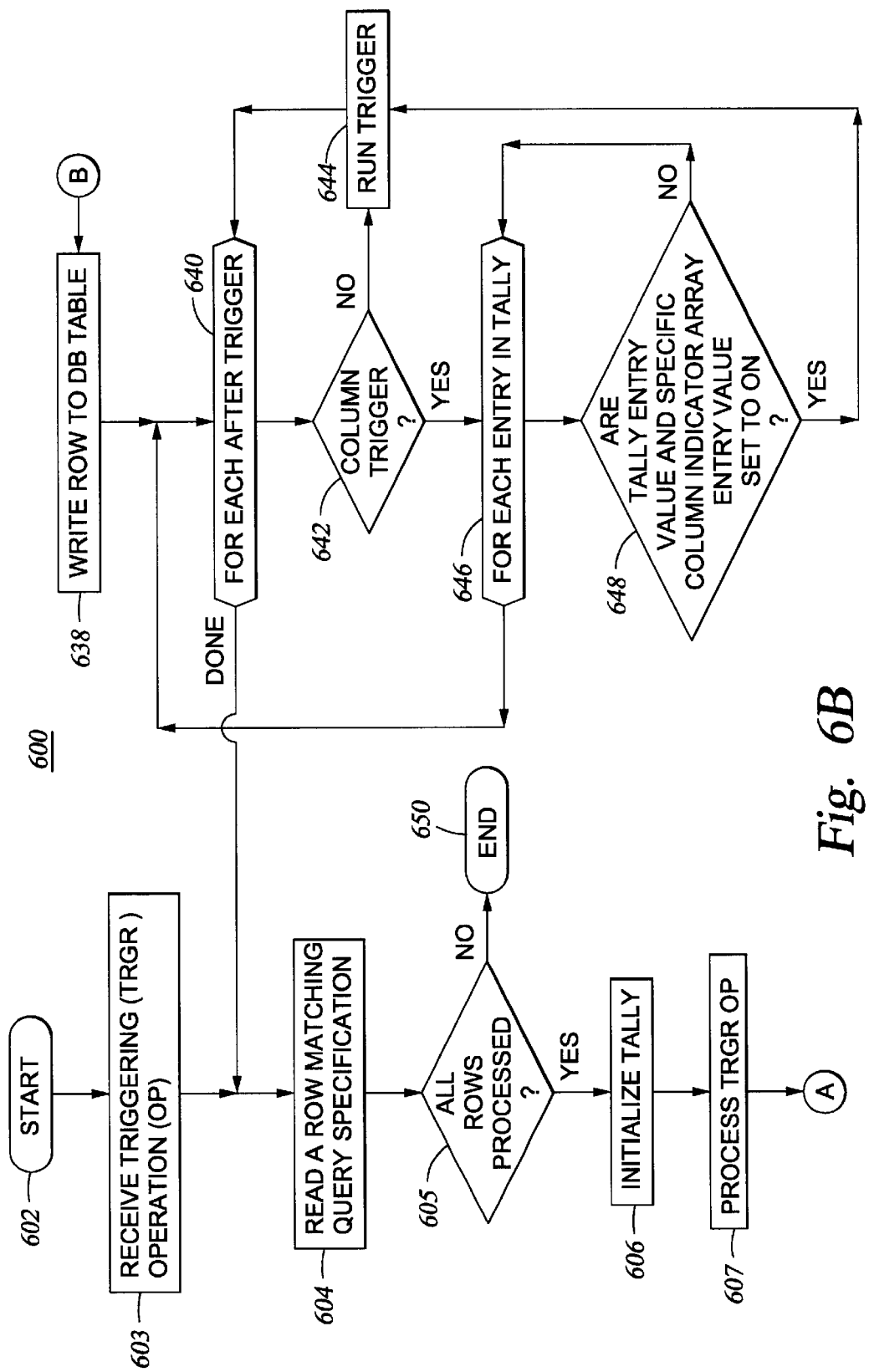

FIG. 6 shows a method 600 for handling a triggering operation. Illustratively, the triggering operation is an UPDATE operation. However, other embodiments contemplate handling any I/O operation, e.g., INSERT, DELETE, etc., and the method 600 is sufficient to describe such operations. The method 600 is entered at step 602 and proceeds to step 603 where the triggering operation is received. At step 604 a row from a table is read according to the specification of the triggering operation. In the case where multiple rows are specified, step 604 is iterative and is returned to at a later time to read another row, as will be described below. At step 605, the method 600 queries whether all rows specified have been processed. If so, the method 600 ends at step 650. Otherwise, the method 600 proceeds to step 606.

At step 606 a tally (such as the one shown in FIG. 4) is initialized. Initialization includes providing an entry for each column in the table being updated. Each entry contains a bit, which is initially set to zero (0). FIG. 8A shows an initialized tally 800 for the table definition 700 shown in FIG. 7. The table definition has three columns 204A. Accordingly, the tally 800 includes three entries $802_{1-3}$.

At step 607, the triggering operation received at step 603 is processed so that changes are applied to the columns being modified. At step 608, the method 600 queries whether the source of the operation is an SQL statement. If so, method 600 proceeds to step 610; otherwise (in the case of non-SQL inputs) the method 600 proceeds to step 612. In the event of an SQL statement, the statement is parsed and analyzed at step 610. At step 614, an affected columns list (such as the list 500 shown in FIG. 5) is built using the statement contents. Thus, an entry is provided in the list 500 for each column affected by the triggering operation statement. FIG. 9 shows an affected columns list 900 containing one entry 902 for column one (1). Such a list 900 may be generated, for example, in response to the UPDATE statement shown on line 8 of Table 1 above.

At step 616, the tally 800 is primed to reflect the affected columns, according to the contents of the affected columns list 900. FIG. 8B shows a primed tally 800' wherein the first entry $802_1$ has been set to ON in accordance with the information contained in the entry 902 of the affected columns list 900.

In the event of a non-SQL triggering operation, the method 600 proceeds from step 608 to 612 where the data of "before" and "after" images of the record (of the table) being modified/updated are compared in order to prime the tally 400. "Before" images reflect the data prior to the modification, while "after" images reflect the data subsequent to the modification. Accordingly, a comparison between the images identifies the changed data. The tally 400 is then primed to indicate which columns are affected by the triggering operation.

Regardless of whether the triggering operation is an SQL or non-SQL statement, once the tally 400 has been primed, the DBMS 100 initiates a series of steps to determine whether a column trigger should be activated for the triggering operation. In one embodiment, this involves comparing the tally 400 with the associated specific columns indicator array 308. If a match occurs, the trigger is activated. One embodiment of such processing is exemplified by the steps beginning at step 618. Step 618 provides an entry point to a loop repeated for each BEFORE trigger definition contained in the DBMS 100 for the table 120 being updated. Thus, reference is made to the trigger count information 206, the trigger definition array 207 and the trigger time information 304 to determine the triggers that must be processed.

At step 622, the method 600 whether the trigger is a column trigger. This determination is made with reference to the trigger type information 306 of the trigger definition 122. In the event of a column trigger, the method 600 enters a loop, beginning with step 624, which is repeated for each entry $404_N$ in the tally 400. At step 626, the method 600 queries whether the value of the entry $404_N$ currently being processed and the value of the respective entry $314_N$ of the specific columns indicator array 308 are set to ON. If so, the trigger being processed is run at step 628. Otherwise, the method 600 returns to step 624 to begin processing the next entry $404_N$.

In this manner, the definition (specifically, the specific columns indicator array 308) of each BEFORE column trigger is checked against the parameters of the triggering operation statement (as represented by the tally 400) to determine whether the trigger should be run. A trigger is then run if its specific columns indicator array 308 indicates that the trigger is defined for the column(s) included in the parameters of the triggering operation. In addition, a trigger is also run if the trigger is not a column trigger, as determined at step 622.

In any case, after running the trigger at step 628, steps are taken to track changes produced by the execution of the trigger itself. That is, once activated, a trigger (whether column oriented or row oriented) may in turn modify additional columns, prior to the triggering operation being written to the database table. In one embodiment, the particular steps taken to track subsequent modifications vary according to the trigger type, i.e., SQL or non-SQL. Accordingly, the method 600 proceeds to step 630 and queries whether the trigger is an SQL trigger. If so, at step 632, reference is made to the modified columns indicator array 310 to determine which columns have been modified by the trigger and the tally 400 is updated accordingly. That is, the contents of the tally 400 are changed to include those columns that have been modified by the trigger. The method 600 then returns to step 618 to begin processing the next BEFORE trigger definition. If step 630 is answered negatively, a data comparison of before and after images is performed to determine which columns were affected and the tally 400 is updated accordingly. Regardless of the trigger type, the tally 400 now reflects each column that is modified, either as a result of the original triggering operation or by virtue of triggers executed in response to the operation.

Once each entry in the tally 400 has been processed, the method 600 returns to step 618 to begin processing the next BEFORE trigger definition. Once all trigger definitions have been processed, the method 600 proceeds from step 618 to 638 where the row being processed is written to the database table. The method 600 then proceeds to step 640.

Step 640 marks the entry to a loop repeated for each AFTER trigger. At step 642 the method 600 queries whether the trigger is a column trigger. This determination is made with reference to the trigger type information 306 of the trigger definition 122. If step 642 is answered negatively, the trigger is run at step 644. Otherwise, a loop is entered at step 646 and is repeated for each entry in the tally 400. At step method 600 queries whether the value of the entry $404_N$ currently being processed and the value of the respective entry $314_N$ of the specific columns indicator array 308 are set to ON. If so, the trigger being processed is run at step 644. Otherwise, method 600 returns to step 646 to begin processing the next entry $404_N$ of the tally 400. Once all the entries for a trigger have been processed, the method returns to step 640 to begin processing the next AFTER trigger. In this manner, the definition (specifically, the specific columns indicator array 308) of each AFTER column trigger is checked against the parameters of the triggering operation statement (as represented by the tally 400) to determine whether the trigger should be run. A trigger is then run if its specific columns indicator array 308 indicates that the trigger is defined for the column(s) included in the parameters of the triggering operation, as well as any additional columns modified by BEFORE triggers. In addition, a trigger is also run if the trigger is not a column trigger, as determined at step 642.

Once all AFTER triggers have been processed, the method 600 returns to step 604 to begin processing another row. If all rows have been read, then the method 600 exits at step 650.

Accordingly, embodiments herein provide a mechanism for maintaining a list/tally of columns that are modified by an UPDATE operation. The list allows for determining which triggers, both row and column oriented, should be activated upon the UPDATE operation. Because triggers themselves can modify additional columns of data once a set of triggers is executed, the DBMS is responsible for tracking these additional columns as well as potentially adding additional triggers to the list of triggers that must be run for the current UPDATE operation. In this manner, the integrity of the DBMS is maintained.

It is noted that the SQL 99 Standard specifies specific requirements for when SQL triggers should be activated. Accordingly, a particular embodiment is implemented to conform with the SQL 99 Standard. For example, rules may include (i) running the column triggers even if no data has been changed; and (ii) running the column triggers even if the condition specified in the conditional clauses is not met. The foregoing implementation is based on the SQL 99 Standard requirement that triggers are run if data has been potentially changed. However, other embodiments are not restricted to the 99 Standard or any other standard.

It is understood that there are many types of triggers and triggering operations and embodiments of the present application are not limited to particular triggers or triggering operations. Table II provides a non-exclusive list of trigger types and operations that may use the processing described above to advantage in determining whether the trigger should be activated.

TABLE II

Triggers:

Before triggers
After triggers
Read triggers
Insert triggers
Update triggers
Delete triggers
Statement triggers
Row triggers
Column triggers
Triggers defined using high level query languages
Triggers defined using database management interfaces
Operations:

High level query languages
Database management interfaces

Another important capability within a database management system, is the ability to modify, or alter existing database objects (i.e., table definitions). Modifications to the table definition include changing the number of columns and the data type definitions. Accordingly, in one embodiment, if a column is added or removed from a database table, when using the methods described above for processing column triggers, the database management system can automatically reprocess the two indicator arrays 308, 310 so that they correctly reflect the actual number of columns that exist in the database table. Specifically, the database management system automatically expands, or contracts the size of the stored indicator arrays, and places the correct information in each entry, so that the correct column information is maintained in the arrays.

One embodiment for automating column trigger handling is illustrated with reference to FIGS. 9 and 10. This particular embodiment is implemented in conformance with the SQL 99 Standard which dictates that if a new column is added to a table, the definitions of the table do not change. However, if a column is removed from the table definition, the triggers must be updated to reflect the changes in the table. Barring conformance with the SQL 99 Standard, the triggers can be modified in both cases. Thus, the inventors contemplate other embodiments not in conformance with the SQL 99 Standard.

Referring now to FIG. 7 a table definition 700 containing three columns is shown and has been described above. FIG. 10 shows a trigger definition 1000 containing a specific column indicator array 308A and a modified columns indicator array 310A. The specific column indicator array 308A indicates that the trigger is defined for all three columns of the table 700. The modified columns indicator array 310A indicates that the trigger modifies all three columns of the table 700. FIG. 11 shows the table definition 700' following an ALTER statement configured to add a fourth column: ALTER TABLE T1 ADD COLUMN4 INTEGER. In this case, the trigger definition 1000 remains unchanged per the dictates of the SQL 99 Standard.

In contrast, FIGS. 12 and 13 illustrate a situation in which the trigger definition 1000 does change. The original table definition 700 and trigger definition 1000 are shown in FIGS. 7 and 10, respectively. The following statement is then processed to remove the first column: ALTER TABLE TI DROP COLUMN COLUMN1. FIG. 12 shows the table definition 700' after the first column has been removed. FIG. 13 shows the modified trigger definition 1000' and reflects that the column entry for the first column has been removed.

Figure 14:
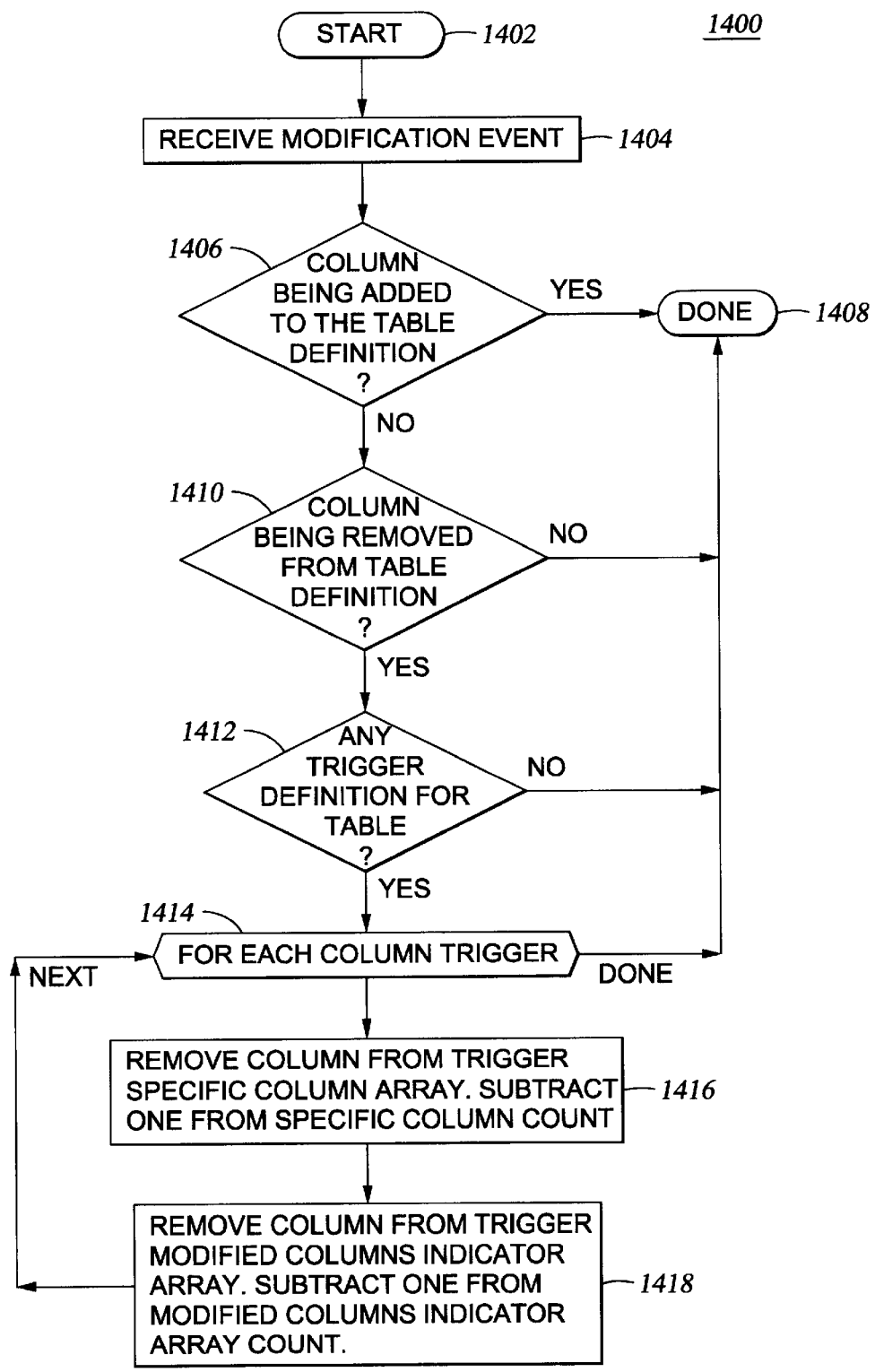
FIG. 14 is a flow chart illustrating a method for managing modifications to a trigger definition.

FIG. 14 illustrates a method 1400 for handling modifications to existing database objects. Method 1400 is entered at step 1402 and proceeds to step 1404 where a modification event is received. At step 1406, the method 1400 queries whether a column is being added to a table definition. If so, the column is added and the method exits at step 1408. Otherwise, at step 1410, the method queries whether a column is being removed from the table definition. If not, the method exits at step 1408. If a column is being removed, the method queries, at step 1412, whether any trigger definitions exist for the table. If not, the method exits at step 1408. Otherwise, at step 1414, the list of triggers in the database is traversed to identify each column trigger. Then, for each column trigger steps are taken to update the indicator arrays 308 and 310. Specifically, at step 1416, the entry corresponding to the removed column is removed from the specific column indicator array 308 and the column count of the array 308 is decremented. At step 1418, the entry corresponding to the removed column is removed from the modified columns indicator array 310 and the column count of the array 308 is decremented. Once all column triggers have been processed, the method 1400 exits at step 1408.

While the foregoing is directed to the preferred embodiment of the present invention, other and further embodiments of the invention may be devised without departing from the basic scope thereof, and the scope thereof is determined by the claims that follow.

What is claimed is:

1. A method of managing triggers in a database containing a plurality of triggers, comprising:
    processing an input/output (I/O) operation, wherein the I/O operation is configured to affect at least one column of a database object;
    priming a tally to reflect the at least one column;
    determining whether a trigger defined for the database object is a BEFORE trigger;
    if so, determining whether the trigger is a column trigger; and
    if the trigger is a column trigger, then determining whether the trigger is configured to be executed in response to the I/O operation with reference to the tally, wherein the trigger is executed if an entry value of the tally matches an indicator value indicating that the trigger is defined for the at least one column.

2. The method of claim 1, wherein determining whether the trigger is configured to be executed in response to the I/O operation comprises determining whether the entry value of the tally corresponding to the indicator value has been changed from an initial value.

3. The method of claim 1, wherein processing the I/O operation comprises:
    determining whether I/O operation is an SQL operation:
    if the I/O operation is an SQL operation, generating an affected columns list indicating the at least one column and then priming the tally using the affected columns list; and
    If the I/O operation is a non-SQL operation, comparing column data before writing data changes to storage to column data after writing the data changes to storage and then priming the tally.

4. The method of claim 1, further comprising, if the trigger is configured to be executed in response to the I/O operation:
    (i) executing the trigger;
    (ii) determining whether the trigger affects at least one other column of the database object; and
    (iii) if so, modifying the tally to indicate the at least one other column.

5. The method of claim 4, wherein processing the I/O operation comprises:
    determining whether I/O operation is an SQL operation;
    if the I/O operation is an SQL operation, generating an affected columns list indicating the at least one column and then priming the tally using the affected columns list; and
    if the I/O operation is a non-SQL operation, comparing column data before writing data changes to storage to column data after writing the data changes to storage and then priming the tally.

6. A method of managing triggers in a database containing a plurality of column triggers, comprising:
    processing an input/output (I/O) operation, wherein the I/O operation is configured to affect at least one column of a database object;
    priming a tally to reflect the at least one column;
    for each column trigger defined for the database object, determining whether the column trigger is configured to be executed in response to the I/O operation with reference to the tally, wherein determining whether the column trigger is configured to be executed in response to the I/O operation comprises evaluating corresponding values in the tally and an indicator array associated with the column trigger.

7. The method of claim 6, wherein the indicator array indicates which columns of the database object, when operated on, result in the execution of the column trigger.

8. A method of managing triggers in a database containing a plurality of column triggers, comprising:
    processing an input/output (I/O) operation, wherein the I/O operation is configured to affect at least one column of a database object;
    priming a tally to reflect the at least one column;
    for each trigger defined for the database object:
        determining whether the trigger is a BEFORE trigger;
        if so, determining whether the trigger is a column trigger;
        if so, determining whether the column trigger is configured to be executed in response to the I/O operation with reference to the tally;
        If so, executing the trigger;
        determining whether the column trigger affects at least one other column of the database object by referencing a modified columns indicator array; and
        if so, modifying the tally to indicate the at least one other column.

9. The method of claim 8, wherein processing the I/O operation comprises:

determining whether I/O operation is an SQL operation;

if the I/O operation is an SQL operation, generating an affected columns list indicating the at least one column and then priming the tally using the affected columns list; and if the I/O operation is a non-SQL operation, comparing column data before writing data changes to storage to column data after writing the data changes to storage and then priming the tally.

10. The method of claim 8, wherein processing the I/O operation comprises:

determining whether I/O operation is a query language operation implemented by a query language statement;

if the I/O operation is a query language operation, determining that the I/O operation affects the at least one column by analyzing the query language statement and then priming the tally on the basis of the analysis; and if the I/O operation is a not a query language operation, determining that the I/O operation affects the at least one column by comparing column data before writing data changes to storage to column data after writing the data changes to storage and then priming the tally on the basis of the comparison.

11. A signal bearing medium containing a program which, when executed by at least one processor, performs a method of managing triggers in a database containing a plurality of column triggers, the method comprising:

processing an input/output (I/O) operation, wherein the I/O operation is configured to affect at least one column of a database object;

priming a tally to reflect the at least one column;

for each trigger defined for the database object:
  determining whether the trigger is a BEFORE trigger;
  if so, determining whether the trigger is a column trigger;
  if so, determining whether the column trigger is configured to be executed in response to the I/O operation with reference to the tally; and if the column trigger is configured to be executed in response to the I/O operation:
  (i) executing the trigger; and
  (ii) determining whether the column trigger affects at least one other column of the database object by referencing a modified columns indicator array.

12. A signal bearing medium containing a program which, when executed by at least one processor, performs a method of managing triggers in a database containing a plurality of column triggers, the method comprising:

processing an input/output (I/O) operation, wherein the I/O operation is configured to affect at least one column of a database object;

priming a tally to reflect the at least one column; and for each column trigger defined for the database object, determining whether the column trigger is configured to be executed in response to the I/O statement by evaluating corresponding values in the tally and an indicator array associated with the column trigger.

13. The signal bearing medium of claim 12, wherein the indicator array indicates which columns of the database object, when operated on by a predetermined operation, result in the execution of the column trigger.

14. The signal bearing medium of claim 13, further comprising if the column trigger is configured to be executed in response to the I/O operation:

executing the trigger;

determining whether the column trigger affects at least one other column of the database object by referencing a modified columns indicator array; and if so, priming the tally to indicate the at least one other column, whereby the tally then indicates both the at least one column affected by the I/O operation and the at least one other column affected by the column trigger.

* * * * *